United States Patent [19]
Psotta

[11] 4,360,283
[45] Nov. 23, 1982

[54] TELESCOPIC STRUCTURAL SUPPORT

[75] Inventor: Ewald Psotta, Daubringen, Fed. Rep. of Germany

[73] Assignee: Ingenium Ingenieurgesellschaft für Mehrzweckbauten Industrieanlagen und Geländenutzung mbH, Bau-Kommanditgesellschaft, Lichtendorf, Fed. Rep. of Germany

[21] Appl. No.: 76,976

[22] Filed: Sep. 20, 1979

[51] Int. Cl.³ .......................... F16B 7/10; F16M 11/00
[52] U.S. Cl. .................................... 403/104; 248/404; 248/412
[58] Field of Search .............. 403/104, 374, 377, 378, 403/409; 248/412, 404, 335, 336, 297.5; 29/123, 121.1

[56] References Cited
U.S. PATENT DOCUMENTS

| | | | |
|---|---|---|---|
| 1,222,915 | 4/1917 | Anderson | 248/404 |
| 1,601,154 | 9/1926 | Wheeler | 29/121.1 X |
| 2,262,325 | 11/1941 | Kenall | 29/123 UX R |
| 2,337,796 | 12/1943 | Baker et al. | 248/412 X |
| 3,346,281 | 10/1967 | Thompson | 403/104 X |
| 3,941,492 | 3/1976 | Meinunger | 403/104 |
| 4,061,300 | 12/1977 | Takahashi | 248/404 X |

FOREIGN PATENT DOCUMENTS

| | | | |
|---|---|---|---|
| 663441 | 9/1965 | Belgium | 248/412 |
| 1552223 | 9/1979 | United Kingdom | 403/104 |

*Primary Examiner*—James Kee Chi
*Attorney, Agent, or Firm*—Max Fogiel

[57] ABSTRACT

A structural support arrangement in which an inner pipe member is telescopically movable within an outer pipe member. The telescopic members have cross-sections of rectangular and/or square pipes. A self-actuated drive roller is held in elongated holes which are inclined to an axis of the support. The drive roller is knurled or has a roughened surface which abuts against the inner pipe member. The inner pipe member, furthermore, is grasped from behind by a roll bearing member which also serves as a back counter bearing for the drive roller. At least one supporting roller may be arranged with divided parts and extend over the width of the inner pipe member. A traverse member on the outer pipe member is movable about a vertical axis and retains a roller holder which extends between the divided portions of the supporting roller.

8 Claims, 7 Drawing Figures

TELESCOPIC STRUCTURAL SUPPORT

BACKGROUND OF THE INVENTION

The present invention relates to a support for construction shells and similar structures, with telescopic supporting members which are movable in each other and are in the form of four-corner pipes or tubular members. A drive roller is held in elongated holes which are inclined to the supporting axis. The drive roller is self-actuated for abutting the inner pipe member.

In supports that have been previously known, the outer pipe is reinforced through a rear wall of a housing, and serves as the counter or back bearing for the drive roller. The drive roller is held in the housing. The conventional support known in the art has the disadvantage of having to overcome frictional resistance between the outer pipe and the inner pipe when being extended.

Accordingly, it is an object of the present invention to provide an arrangement in which the mechanism for extending the support is constructed so that the extension process of the support can be achieved with substantially light application of forces.

Another object of the present invention is to provide an arrangement of the foregoing character, which is substantially simple in construction and may be economically fabricated.

A further object of the present invention is to provide an arrangement, as described, which may be readily maintained in service and which has a substantially long operating life.

SUMMARY OF THE INVENTION

The objects of the present invention are achieved by providing a back or counter bearing for the drive roll and is in the form of a roll bearing which grasps the inner pipe from behind. As a result of this arrangement, the frictional resistance is substantially eliminated, and the force necessary for extending the inner pipe is correspondingly reduced. In the simplest case, a supporting roller is provided for grasping or catching the inner pipe from behind. With the supporting roller being divided into parts and extending over the width of the inner pipe, an improved assembly to the inner pipe is obtained. The arrangement assures that the inner pipe is abutted over its full width. For the purpose of realizing light surface pressure, two divided supporting rollers may be provided spaced one above the other. The attachment or assembly of the supporting roller pieces can be still further improved, when a roller holder extends between the divided pieces. The roller holder is retained by a traverse which is movable about a vertical axis of a housing on the outer pipe member four on the drive roller, whereby the supporting rollers can be positioned against the abutting surface of the inner pipe.

The supporting rollers are held in ball bearings, in an advantageous embodiment.

An additional advantage of the extension mechanism, according to the present invention, is that this mechanism incurs less friction and wear than the conventional arrangements known in the art.

A further disadvantage of the conventionally-known telescopic support, is that each support is provided with an integral part of the extension mechanism, and this results in costly fabrication of the extension mechanism.

In accordance with the present invention, therefore, an extension mechanism or outward drive mechanism is provided detachably or releasable on the outer pipe, in addition to the clamping arrangement for fixing in place the inner pipe. This extension mechanism can be placed on a support in a manner so that a plurality of supports can be served by the same extension mechanism. Since a clamping arrangement must be generally provided from the viewpoint of safety, no additional costs are incurred in accordance with the construction of the present invention.

In an advantageous embodiment of the present invention, a housing for the extension mechanism may be placed on the outer pipe, whereby openings cut into the outer pipe are not necessary for the passage of the drive and the supporting rollers. In accordance with a special embodiment, the extension mechanism has an open housing on an opposite side of the drive roller. The housing, furthermore, has sides projecting over the inner pipe and suspending detachably the supporting roller. The bearings for the supporting roller are preferably constructed so that the supporting roller can be removed from the housing only when the drive roller is raised and the housing may thereby be located in place. For purposes of fixing the location of the extension mechanism, the housing is provided with a shoulder grasped or caught from below by claws that are pivotable on the outer pipe. The supporting roller axis can serve for this pivotable arrangement. With the aid of the claws, the supporting roller can also be lifted out of its bearing.

In an embodiment adaptable particularly for divided supporting rollers, a housing is provided for receiving the drive roller and the supporting roller. On an opposite side of the drive roller, a housing side holds pivotably a traverse. The traverse is detachably fixed to another side of the housing. To provide for a detachable connection between the traverse and the latter side part, a bolt arrangement is provided. The fixing of the extension mechanism on the outer pipe holds by the claws attached to the side parts and the traverse of the extension mechanism, which engage under shoulders of the outer pipe upon placement of the extension mechanism.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
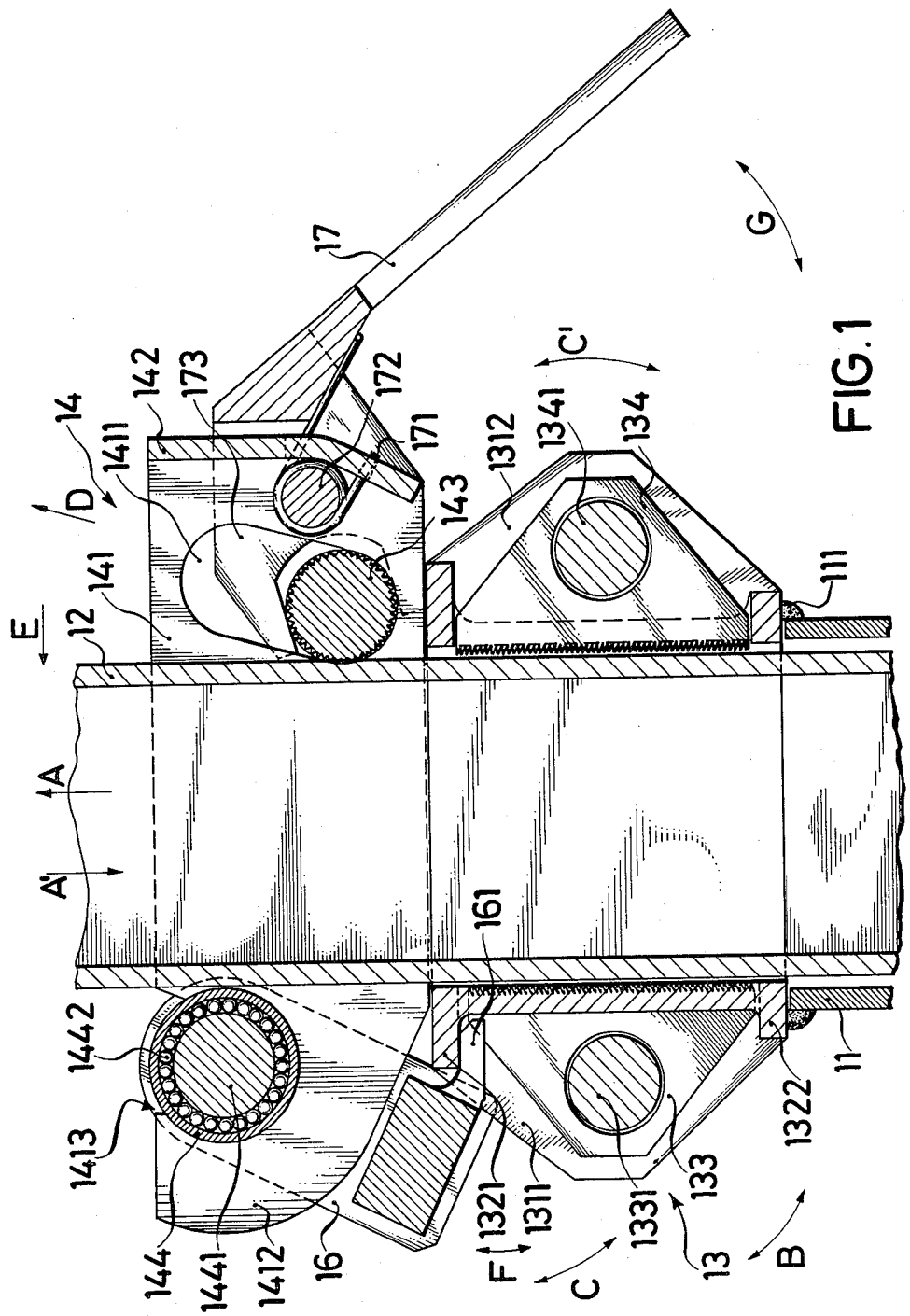
FIG. 1 is an elevational sectional view through an essential part of the telescopic support, in accordance with the present invention.

Referring to the drawings, the telescopic support for brace consists of an outer tubular or pipe support member 11 and an inner tubular or pipe support member 12 which is guided within the member 11 and can move outward in the direction of the arrow A. The outer pipe member 11 has a clamping arrangement 13 as an essential part, and there is also provided an extension drive mechanism 14 which may abut the support members, 11, 12 when necessary.

The clamping arrangement 13 has a housing which is formed of two cheek portions 131, 131' and two cross members 132, 132' with angled rim portions 1321, 1322 extending outwardly. In the end regions 1311 and 1312 of the cheek portions 131, 131' projecting over the cross members 132, 132', are, on one side, the clamping member 133 and, on the other side, ball back bearing member 134. The clamping member 133 is mounted on an eccentric axis 1331 to approach close to the inner pipe member 12 from below (arrow B). The back bearing member 134 is mounted on a normal axis 1341. The clamping member 133 as well as the back bearing 134 are formed from two spaced recesses 1323, 1323' in the cheek or wall portions 133, 133' or 134, 134' penetrating the cross members 132 and 132'. Upon tightening the clamping member 133 with the aid of a key attached at 1332 on the eccentric axis 1331, the cheeks or wall portions 133, 133' or 134, 134' are clampingly brought against the rim region 121 of the inner pipe member 12. The turnable bearing (arrow C and C') as well as the essential part of the clamping member 133 in the form of portions 133 and 133' and the essential parts of the back bearing 134 formed by portions 134 and 134', make it possible to provide an optimum fitting of the portions at the upper surface of the inner pipe member 12.

The clamping arrangement is an integrated part of the support members 11, 12 and is welded (111) to the outer pipe member 11 on which it is mounted. The clamping arrangement is not the subject of the present invention.

Figure 2:
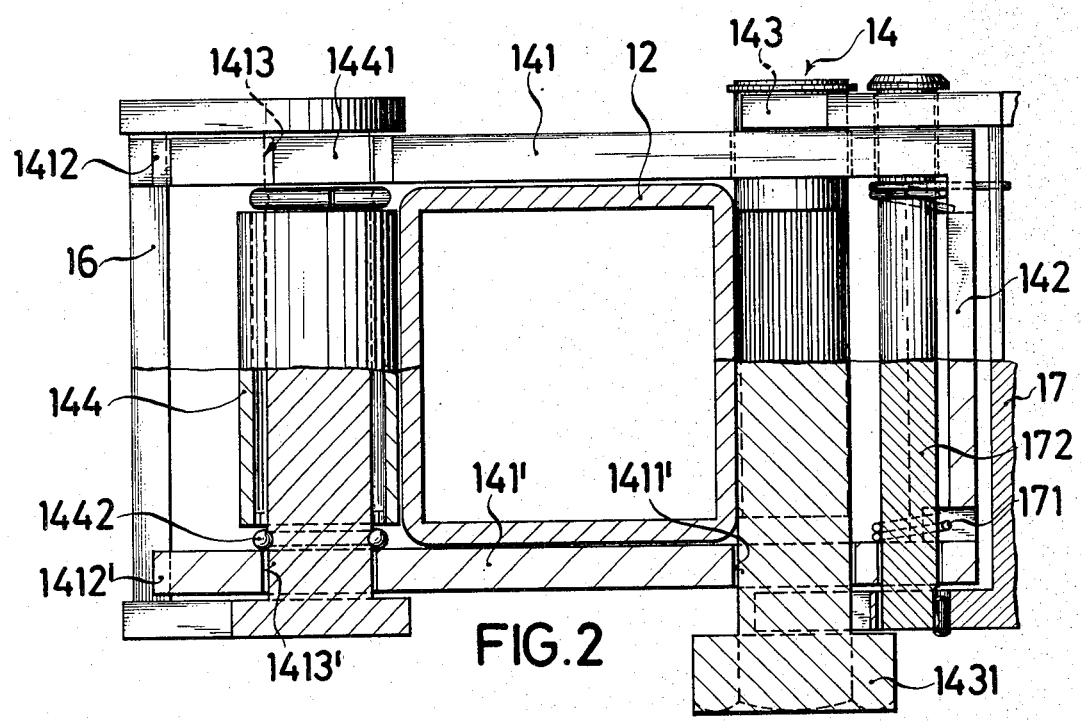
FIG. 2 is a plan view of FIG. 1.
Figure 3:
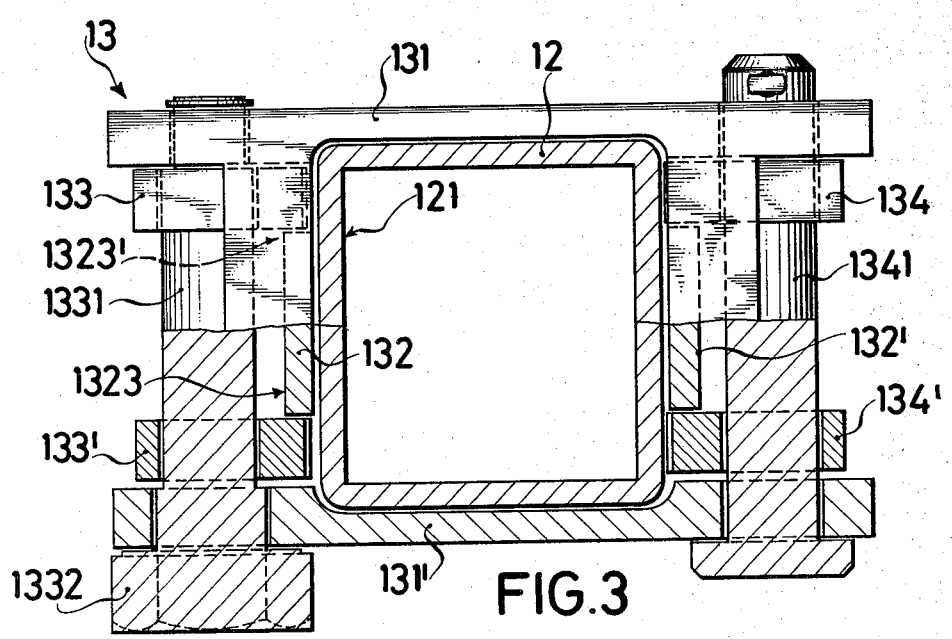
FIG. 3 is a plan view corresponding to FIG. 2 without the extension mechanism.
Figure 4:
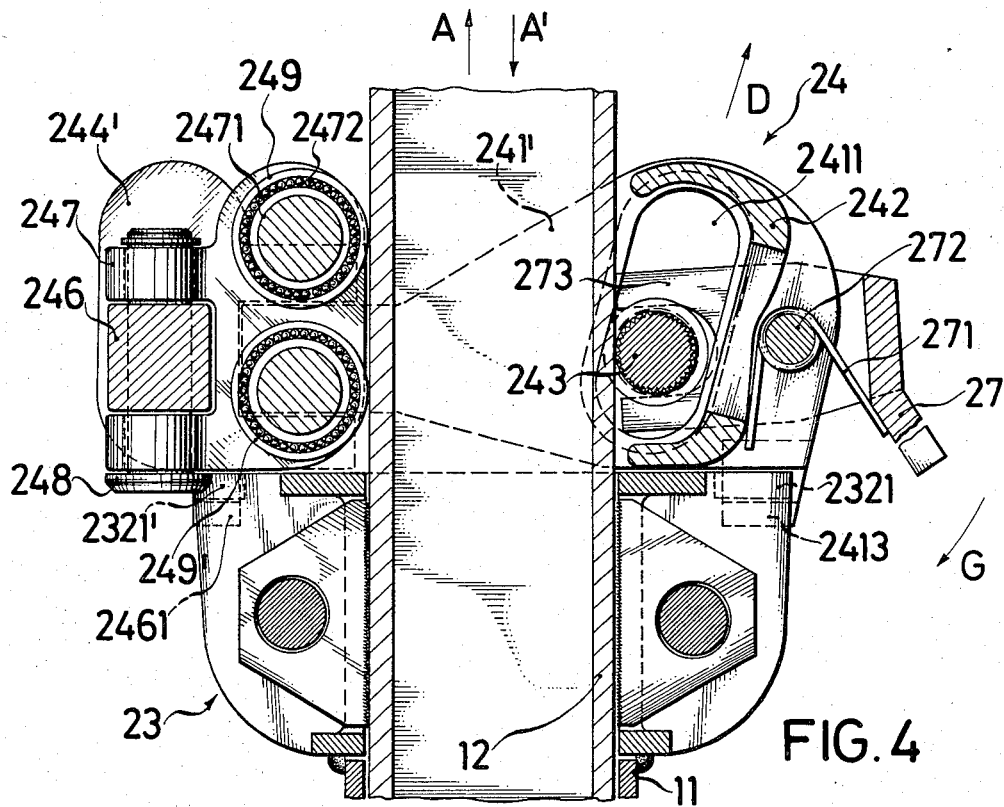
FIG. 4 is an elevational sectional view of another embodiment of the telescopic support, in accordance with the present invention.
Figure 5:
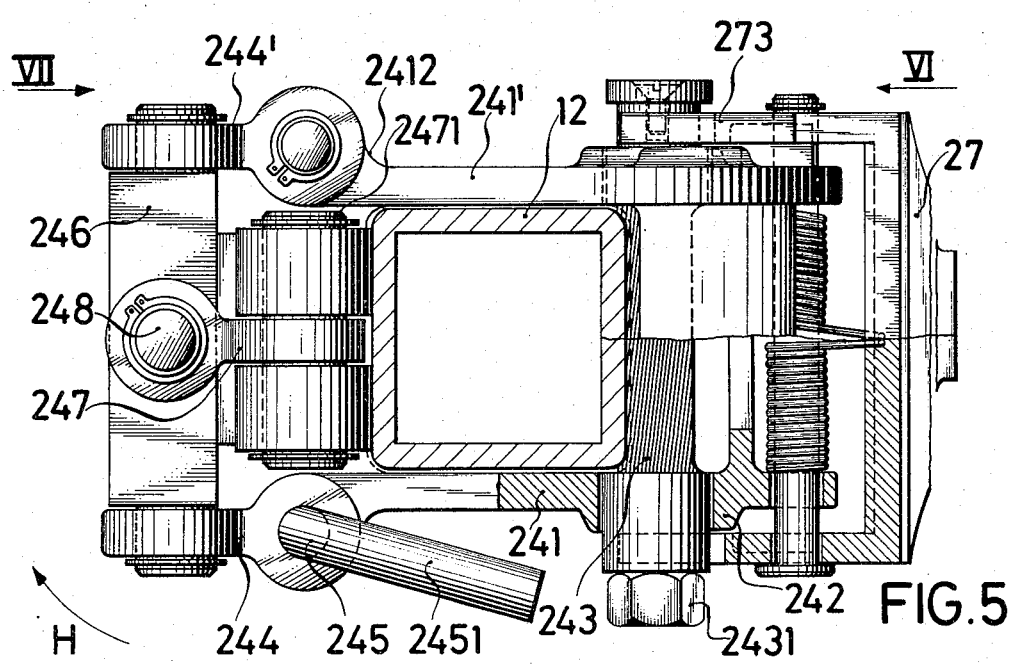
FIG. 5 is a plan view of the embodiment of FIG. 4.
Figure 6:
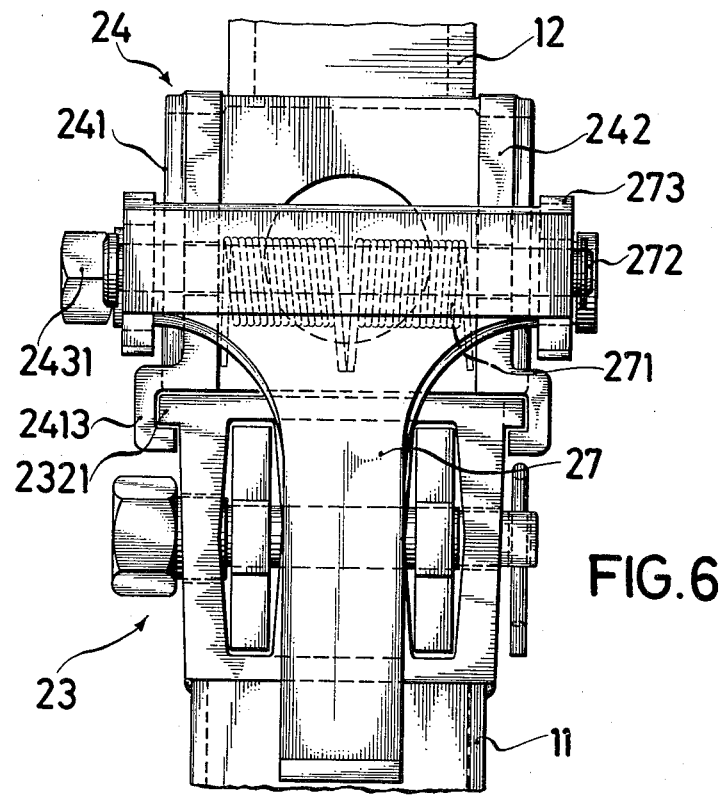
FIG. 6 is a view taken in the direction of arrow VI in FIG. 5.
Figure 7:
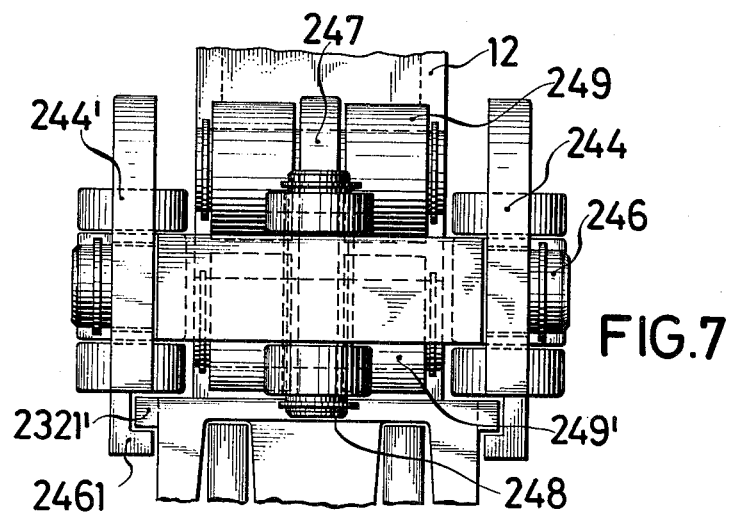
FIG. 7 is a view taken in the direction of arrow VII in FIG. 5.

The drive mechanism 14 may be detachably brought upon the support members 11, 12 and is shown in FIGS. 1 to 3. This mechanism 14 consists of a housing formed from two walls 141 and 141' connected through a cross member 142 at a front side. In this housing, are elongated holes 1411, 1411' which extend cross-wise (142) against the supporting axis. In the elongated holes 1411, 1411' is a driving roller 143 which is knurled and bears against the inner pipe member 12. The drive roller 143 is provided with a head 1431 for attaching thereto a key. Wall portions 141, 141' also extend at the free end, over the inner pipe member 12 of the support members 11, 12. In the projections 1412 and 1412' are two bearing members 1413 and 1413' from above, to receive the supporting roller 144 which catches the inner pipe member 12 from behind. With raised driving roller 143 (arrow D) and thereby further possible retention of the housing in the direction of arrow E, the supporting roller 144 may be suspended in the bearings 1413, 1413'. In the embodiment shown, the supporting roller 144 is on a sleeve on the supporting roller axis 1441 through a ball bearing 1442. A member 16 with semi-circular portion is suspended pivotably on the supporting roller axis 1441 (in the direction of double arrow F). Claws 161, are provided on the member 16 and grip from below the shoulders 1321 of the housing for the clamping arrangement 13 upon abutment of the drive mechanism 14 to the support members 11, 12.

A lever 17 is rotatable about the axis 172 (arrow G), and assumes the initial position shown under the action of a spring 171. The lever 17 has fork-shaped portions 173 reaching over the driving roller 143. With the lever 17, the driving roller 143 can be raised (arrow D), whereby the inner pipe member 12 is released to ride inward or downward (arrow A').

In FIGS. 4 to 7 the telescopic support consists again of the outer pipe member 11 and the inner pipe member 12 which is guided therein and may extend outward (arrow A). There is also provided clamping arrangement 23 as a part of the outer pipe member 11, as well as the driving out mechanism 24 which may be brought against the support members 11, 12 when necessary. The construction and operation of the clamping arrangement 23 correspond to those described in relation to the telescopic support in FIGS. 1 to 3.

In accordance with FIGS. 4 to 7, the drive mechanism 24 which may be detachably brought against the support members 11, 12, consists of a housing formed from two wall portions 241, 241' connected through a cross member 242 at a front side. In the wall portions 241, 241' are elongated holes 2411 which extend cross-wise (242) against the supporting axis. In the elongated holes 2411 is the driving roller 243 which is knurled and abuts the inner pipe member 12 of the support members 11, 12. The driving roller 243 is provided with a head 2431 for attachment of a key. The wall portions 241, 241' run in the bearing 2412 at the free end projecting over the inner pipe member 12. These receive the eyes or ends of a bolt 245 which penetrates the bearings 244, 244'. At least one of them is detachable. The bearings 244, 244' are connected at free ends through a traverse member 246 which is rotatably held therein. The traverse member 246 is provided at the center with a vertical bore. From the traverse 246 extends a holding member 247 toward the inner pipe member 12 and receives an eye or end of a bolt or shaft member 248. Shaft stumps or ends 2471 are provided on the holding member 247 for seating parts attaching the inner pipe member 12 from behind and held in ball bearings 2472 of the bearing rollers 249, 249'.

To detach or release the extension mechanism 24, the bolt member 245, which is provided with a gripping portion 2451, is drawn, and the traverse 246 is moved away (arrow H). As a result, the mechanism 24 can be removed from the support members 11, 12. A lever 27 is rotatable about the axis 272 (arrow G) and assumes the initial position shown under the action of a spring 271. The lever 27 extends in the drive roller 243 with the end regions 273. The drive roller 243 can be raised with the lever 27 (arrow D), whereby the inner pipe member 12 is released to move inward (arrow A').

The mechanism 24 is fixed at the support 11, 12 to claw members 2413 at the side portions 241, 241' and claws 2461 at the traverse 246. Upon actuation or startup of the mechanism 24, they move or slide under the shoulders 2321, 2321' formed on the clamping arrangement 23.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed is:

1. A structural support comprising: telescopic parts movable into one another and comprised of rectangular pipe members; one of said telescopic parts being an inner pipe member and movable outward; a self-actuated drive roller held in elongated holes inclined to an axis of said support for abutting against said inner pipe member; said drive roller being knurled; and roll bearing means for grasping said inner pipe member from behind and being a back counter bearing for said drive roller; to divided supporting rollers spaced one above the other for providing increased surface pressure capacity; roller holding means extending between divided portions of said supporting roller; and a transverse member connected to an outer pipe member and movable about a vertical axis for retaining said roller holding means; outward drive means for releasing said support; a housing on said outward drive means and on said outer pipe member of said support; a traverse member pivotable on one part of said housing and detachably fixed to another side part of said housing on an opposite side of said drive roller, said housing being freely removable to one side of the support.

2. A structural support as defined in claim 1, including a divided supporting roller extending over the width of the inner pipe member.

3. A structural support as defined in claim 2 wherein said supporting roller is held in ball bearings.

4. A structural support as defined in claim 1, including clamping means on an outer pipe member for fixing in place said inner pipe member; and outward drive means for releasing said support.

5. A structural support as defined in claim 4 including an open housing on an opposite side of said drive roller; and a supporting roller suspended detachably on projecting side portions of said housing.

6. A structural support as defined in claim 1, including a supporting roller; claw means rotatably mounted on said supporting roller for grasping from below a shoulder on an outer pipe member.

7. A structural support as defined in claim 1, including detachable bolt means between said traverse member and said housing.

8. A structural support as defined in claim 1, including clamping means on an outer pipe member for fixing in place said inner pipe member; said supporting roller being held in ball bearings; and detachable bolt means between said traverse member and said housing.

* * * * *